US012767563B2

(12) United States Patent
Grimes et al.

(10) Patent No.: US 12,767,563 B2
(45) Date of Patent: Oct. 20, 2026

(54) ISOLATION OF AMMONIA FROM WASTEWATER WITH STRUVITE

(71) Applicant: Perseverance Water Guardian LLC, Sarasota, FL (US)

(72) Inventors: Savannah Mae Grimes, Palm Bay, FL (US); Gary Lee Bastin, Palm Bay, FL (US); Edward Rosenthal, Sarasota, FL (US)

(73) Assignees: Edward Rosenthal, Sarasota, FL (US); Jonathan Rosenthal, Atlanta, GA (US); Jeffery Benjamin, Sarasota, FL (US)

( * ) Notice: Subject to any disclaimer, the term of this patent is extended or adjusted under 35 U.S.C. 154(b) by 0 days.

(21) Appl. No.: 19/066,133

(22) Filed: Feb. 27, 2025

(65) Prior Publication Data

US 2025/0276916 A1 Sep. 4, 2025

Related U.S. Application Data

(60) Provisional application No. 63/559,870, filed on Feb. 29, 2024.

(51) Int. Cl.

| | |
|---|---|
| ***C02F 1/28*** | (2023.01) |
| ***B01J 20/04*** | (2006.01) |
| ***B01J 20/34*** | (2006.01) |
| ***C02F 101/16*** | (2006.01) |
| ***C02F 103/20*** | (2006.01) |

(52) U.S. Cl.

CPC ............ *C02F 1/281* (2013.01); *B01J 20/048* (2013.01); *B01J 20/3483* (2013.01); *C02F 2101/16* (2013.01); *C02F 2103/20* (2013.01); *C02F 2201/002* (2013.01); *C02F 2209/02* (2013.01); *C02F 2209/06* (2013.01); *C02F 2303/16* (2013.01)

(58) Field of Classification Search

CPC .. C02F 1/281; C02F 2101/16; C02F 2103/20; C02F 2303/16; B01J 20/048; B01J 20/3483

See application file for complete search history.

(56) References Cited

U.S. PATENT DOCUMENTS

| | | | |
|---|---|---|---|
| 10,676,374 | B1 | 6/2020 | Lunn et al. |
| 11,897,823 | B2 | 2/2024 | Rosenthal et al. |

*Primary Examiner* — Benjamin M Kurtz

(74) *Attorney, Agent, or Firm* — Hershkovitz & Associates, PLLC; Abe Hershkovitz; Eugene C. Rzucidlo

(57) ABSTRACT

An ammonia capture process comprising a cyclic regeneration process between Magnesium Ammonium Phosphate (MAP) and Magnesium Phosphate (MP to achieve ammonia release.

9 Claims, 1 Drawing Sheet

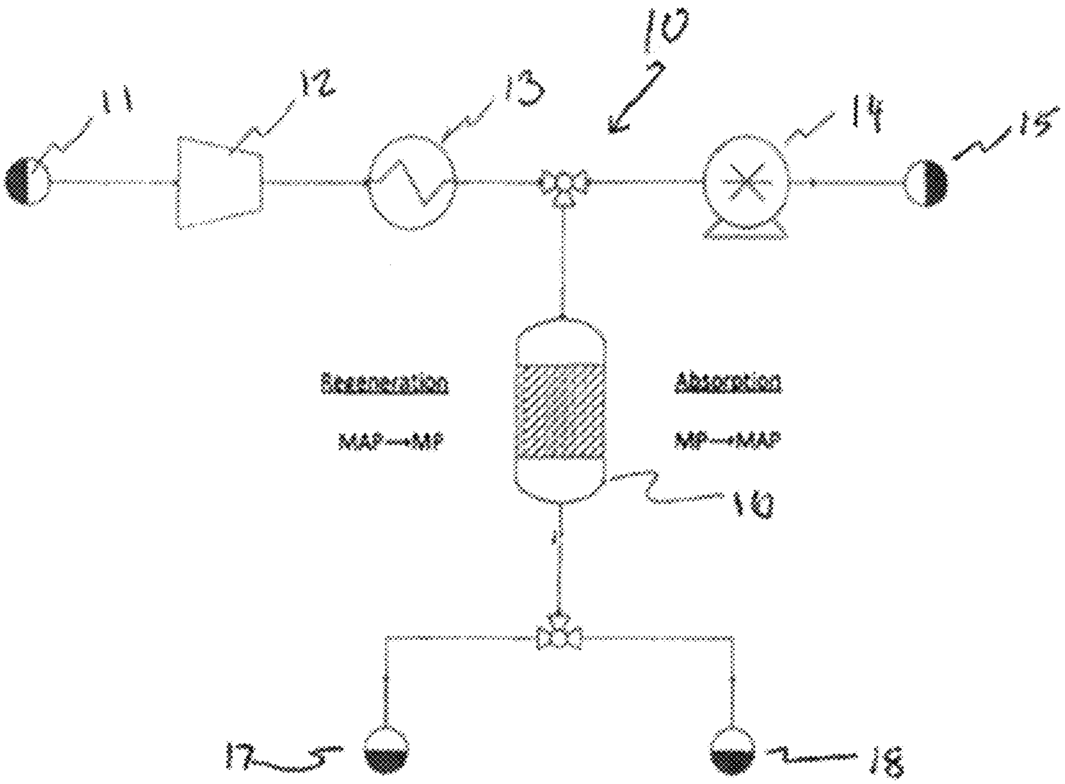
10
11
12
13
14
15
Regeneration
MAP→MP
Absorption
MP→MAP
10
17
18

ISOLATION OF AMMONIA FROM WASTEWATER WITH STRUVITE

TECHNICAL FIELD

Terrestrial application involving treating large, open-ended quantities of wastewater without requiring replacement of Struvite media within a reactor.

BACKGROUND

A NASA ammonia capture patent (U.S. Pat. No. 10,676,374 B1) disclosed ammonia capture from wastewater. However, this patent did not provide a practical process for use in treating wastewater in commercial practice for terrestrial applications involving large quantities of wastewater.

The original NASA patent used a multi-pass reactor approach that reduced the effectiveness of the basic properties of Struvite in respective regeneration cycles, as reported in the patent, utilizing the Struvite media as a consumable during ammonia removal from wastewater. In applications in Space, this approach is often considered acceptable for processing and treating limited quantities of wastewater. A given mass of Struvite sent into space can process a specified mass of ammonia laden wastewater.

SUMMARY

Aspects of the present disclosure determine the multiple parameters that are important to successfully create a cyclic process between Magnesium Ammonium Phosphate (MAP) and Magnesium Phosphate (MP). One goal of regeneration is to achieve ammonia release by thermal energy from MAP.

To carry out an acceptable large scale ammonia capture process, the media must be wet prior to the start to prevent media channeling, and then preheated and pressurized air is sent to the MAP-packed reactor. During heating, an external heating source is used to ramp the internal media temperature to initiate ammonia release, and the temperature is held at 60° C. for 60-90 minutes, depending on desired ammonia release. When the temperature is too low (e.g., <50° C.), there is not enough thermal energy to trigger significant ammonia release. When the temperature is too high (e.g., >100° C.), the media will transform into a magnesium phosphate derivative that cannot be converted back into MAP or struvite. Therefore, temperature control is an influential variable in regeneration.

Successful regeneration can be achieved by reactors with a wide range of length to diameter ratios (e.g., 5-19). The gas stream exiting the reactor is bubbled through sulfuric acid to entrain that ammonia and create a diluted ammonium sulfate.

The goal of absorption Is to achieve ammonia uptake by MP which simultaneously treats ammonia-laden wastewater. Two influential parameters on absorption are pH and contact time. An elevated pH (e.g., >9) and high contact time (e.g., >25 seconds) yield a higher ammonia absorption. A high pH will prevent the MP media from dissolving (and limiting the amount available to react with the ammonia). A higher contact time (and lower flowrate) will provide more time for the ammonium ions to react and absorb into the media. If the flowrate is too low, there will not be a high enough Reynolds number to allow for mixing between the media and the ions in the wastewater. A L:D ratio between 4-6 may be preferred because it not only increases absorption but also decreases operating costs. Maintaining a stable backpressure prevents media loss and operating at a temperature of above 50° F. also improves absorption.

BRIEF DESCRIPTION OF FIG. 1

FIG. 1 shows an embodiment for carrying out the process, according to some embodiments.

DETAILED DESCRIPTION

FIG. 1 shows a schematic of an embodiment (10) of a process, according to some embodiments. The left side of the packed column (16) shows the regeneration step of the process in which Newberyite is regenerated and converted to Struvite. The regeneration process is where thermal energy causes a chemical transformation of MAP into MP, releasing gaseous ammonia and water vapor into the air stream to be captured in the mineral acid container (17). In FIG. 1, Element 11 is the ambient air source; Element 12 is the compressor in which the air flows; Element 13 the is the heater in which the air flows; and Element 14 is the pump in which the ammonia-laden wastewater flows through.

The right side of the column (16) demonstrates the absorption cycle where ammonia-laden wastewater (15) is pumped through the MP/MAP packed column (16), and the ammonia in the ammonia laden wastewater (15) interacts with the MP media and is absorbed to create MAP. The result is an ammonia-reduced wastewater stream (18) exiting the column (16) and the ammonia freed from the wastewater is sent to the mineral acid container (17).

The exact method of this sequestration and release of ammonia, all while retaining continuous reversibility, and physical and chemical properties between the two states, requires precisely controlling the following parameters for a given L:D (Length to Diameter) ratio reactor:

1. Wetting of the mixed MAP/MP media with deionized water to flush any remaining hard water contained inside the reactor to prevent fouling or delay any buildup of calcium deposits. Wetting of the media also prevents non-uniform thermal gradients that would otherwise occur during regeneration within reactor media. Non-uniform heating allows the conversion of media into compounds that are irreversible with respect to ammonia sequestration and release of ammonia. Undesirable compounds generated through overheating (for example, above 100° C.) would destroy the media's ability to capture and release ammonia repeatedly due to conversion of some or all the media to various forms of magnesium orthophosphates and other unusable compounds.
2. Switching from influent flow (whether wastewater or deionized water) to purge compressed air at 30 psig typical (for example, chosen within the range of 25-40 psig) that is heated between 140° C. to 160° C. and passed through the reactor to purge and then carry the ammonia vapor out to an acid capture bath, with the acid bath often implemented in the form of 1 M sulfuric acid, where the air, ammonia, and water vapor bubble through the sulfuric acid, producing ammonium sulfate. Other end capture products are also envisioned depending on choice of acid chosen to react with the ammonia being released in a gaseous state during regenerations.
3. Using thermostatic control while employing external reactor heating, ramping the reactor with its internal media temperature quickly (for example, <3 minutes)

from ambient temperatures nominally at 25° C. to temperatures within the range from 55° C. to 70° C., but nominally at 60° C. It is important never to overheat the outer annular skin of media located inside the cylindrical reactor closest to the outside of the reactor to any temperatures above 100° C. to prevent transforming Newberyite media in the reactor to an orthophosphate without an ability to entrain ammonia. If this occurs, then the reversible process between Struvite and Newberyite is destroyed, and the orthophosphate becomes forever unable to entrain ammonia. Proper heating is accomplished by thermostatically turning off the high Wattage heater(s) upon the reactor skin temperature reaching 60° C. Heating the reactor internally, in contrast, increases the likelihood of slowly transforming more and more of the Struvite and Newberyite (MAP/MP media) in a one-way reaction to an orthophosphate causing a slow loss of mass of usable MAP/MP media for capturing and releasing ammonia, shortening the time before needing to unpack a reactor and repack with fresh MAP/MP media.

4. Upon the reactor reaching the desired thermostatically controlled setpoint temperature of 60° C.+/−5° C., turning off the rapid ramp closed-loop heating and switching to a lower Wattage holding heater in open loop mode for holding the media temperature in the reactor at a desired regeneration temperature of 60° C.+/−5° C. for 75 minutes, nominal. Heating the media for longer than 90 minutes reduces the efficacy of the process, as does heating the media for less than 60 minutes. This heat soak is required to release more of the sequestered ammonia from the MAP, and to convert more of the media to mostly MP, albeit with media still being slightly a mixture of MAP/MP.
5. Upon regenerating for up to 75 minutes, stopping the flow of heated air into the reactor, and out from the reactor into an acid bath and switching flow control valves from regeneration mode to absorption mode flows for the reactor.
6. Pumping wastewater through the reactor at a minimum contact time of 25 seconds (nominal) calculated from reactor volume for soft water. Furthermore, longer contact times are known to be especially beneficial for use with hard water influent laden with ammonia to allow sufficient time for the ammonia laden wastewater to have time to react fully with the MP media. For very hard water, contact times >2× the nominal contact time used with soft water are envisioned. For cases where water hardness is not as high, contact times ranging from nominal contact times used in soft water to contact times of approximately 1.5× the nominal contact times are envisioned.
7. Continuing this process while monitoring the output stream exiting from the reactor until seeing a significant rise in ammonia content, indicating that the reactor has reached its ammonia capture capacity.
8. Upon reaching the ammonia capture capacity of the media in the reactor, stopping the flow of influent ammonia laden wastewater through the reactor, and re-entering the regeneration process for capturing and releasing ammonia shown in Steps 1-5 above, retracing the process in this reversible Struvite and Newberyite media process for capturing and then releasing ammonia as a product for use in commercial industry.

The adjusted pH for influent wastewater processing matters. A pH at 9.5 nominal, but within the range of 9.0 to 9.9 is known to improve absorption efficiency. At lower pH values, there is a tendency for the Struvite/Newberyite to dissolve, causing a reduction in media particle sizes and allowing these smaller particles to escape the reactor through the fiberglass filters (or similar filtration material). Filtration material is placed before and after the reactor vessel to provide media stability in the reactor and prevent media loss within discharged wastewater. Raising the pH of the influent wastewater stream before processing it in the reactor and removing ammonia reduces the loss of small media particles and improves absorption by retaining more media mass. Acid dosing into the waste effluent stream prior to release, to return the elevated pH to within the range of 6.0 to 9.0 pH, is envisioned before returning treated wastewater back to a holding pond to meet necessary environmental requirements.

Simultaneous to ammonia absorption occurring during the absorption phase, backpressure of the packed reactor with media decreases, coinciding with a loss of magnesium occurring from within the media. To overcome significant magnesium loss, thereby preventing the overall loss of MAP and MP media, it is envisioned to dose the influent wastewater stream with magnesium chloride (or similar magnesium compounds) to encourage instead the production and increase of MAP and MP media during ammonia absorption, thereby reducing the need to repack the reactor with media as often. The magnesium addition extends the life of the media in the packed reactor and reduces operating costs by avoiding labor costs required for replacing Struvite media within the reactor, as well as avoiding the cost of procuring new Struvite media.

To maximize the process efficiency, the L:D ratio of the reactor must be operated within narrow limits to reduce backpressure and required pump sizes, thereby decreasing the recurring operating electricity costs per kilowatt-hour, further maximizing ROI. An L:D ratio of approximately 4 to 6 is especially beneficial for reducing operating energy costs and improving processing efficiency. L:D ratios of 10 or more can capture and release ammonia, but such large ratios increase backpressure, reduce pumping efficiency, and additionally require the use of larger pumps with higher recurring costs. The regeneration is equally effective for such higher L:D ratios, as well as at lower L:D ratios. However, absorption efficiency and power consumption efficiency required for pumping wastewater through the reactor are maximized for L:D ratios at 5, nominal, but envisioned over the range from 4 to 6, depending on constraints arising from heating requirements for both influent wastewater and for reactor media that are required during colder weather.

For use in winter weather conditions, the use of MAP/MP reactors with a maximum diameter held to 10-inches or less approximately reduces difficulties in achieving the desired reactor regeneration temperatures identified above with respect to reducing the size of reactor heaters and lessening the power requirements for ramping reactor temperatures in <3 minutes. For use in more hospitable climates, larger diameter reactors with respective lengths can reduce backpressure and therefore pump sizes, resulting in lower operating costs. Climate conditions must be considered versus simply focusing on backpressures, for lessening the size of pumps, and lessening the power consumptions required, and maximizing ROI. A complete engineering trade must be done for each set of operating conditions specific to each installation to maximize ROI.

The normal temperature range of influent wastewater is envisioned to be in the range of 50° F. to 95° F. for this process; otherwise, ammonia absorption will become reduced at ambient influent wastewater temperatures below 50° F. due to slower ammonia absorption kinetics. Due to higher operating costs from sufficient heating for regeneration and heating the wastewater influent above 50° F., it may be preferable for many applications to operate ammonia capture systems using this MAP/MP method process solely during warmer months of the year.

Ammonia capture for fertilizer production with an MAP/MP method process is therefore anticipated to be a warm weather process only for maximizing ROI. Water cleanup applications are envisioned to be possible year-round, at the loss of capturing ammonia. U.S. Pat. No. 11,897,823 B2 describes an example process for production of nitrogenous fertilizer from wastewater.

For a given ammonia sequestration processing station, parallel reactors are envisioned to continuously alternate between regeneration, cooling, and absorption modes, respectively. Cycling each individual reactor between these three states allows for taking advantage of the differences in power consumption and cooling times required to maximize overall efficiency and processing speed, resulting in additional thousands of gallons of processed wastewater per month per MAP/MP skid. This ammonia capture method may be done with 1, 3, 6, or 9, reactors, or with any number of reactors more than 1, that are piped appropriately. But the use of quantized numbers of 3 reactors per set, with a total of 3, 6, or 9 reactors in 1, 2, or 3 sets of reactors, are envisioned to maximize processing time efficiencies for the two modes of absorption, regeneration, while allowing time for cooling a reactor after regeneration heating, for allowing processing many more thousands of gallons of wastewater per month.

The process identified herein of operating in a single-pass reactor design approach enables preservation of the required mass chosen of Struvite (MAP/MP) media within the reactor without any loss of effectiveness upon subsequent regenerations, unlike the earlier NASA patent experimental results that were based on a multi-pass utilization method of using Struvite.

The present teachings show that the degradation of the effectiveness of MAP/MP media as noted in the original NASA patent can be avoided through careful control of all the parameters identified herein. The present process with the teachings identified herein is therefore suitable for use in commercial wastewater treatment plants, such as for processing manure ponds fed from animal wastes coming from dairy, chicken, pig, fish, and from many other animal farms.

While various embodiments of the present disclosure are described herein, it should be understood that they have been presented by way of example only, and not limitation. Thus, the breadth and scope of the present disclosure should not be limited by any of the above-described embodiments. Generally, all terms used herein are to be interpreted according to their ordinary meaning in the relevant technical field, unless a different meaning is clearly given and/or is implied from the context in which it is used. All references to a/an/the article, element, device, component, layer, means, step, etc. are to be interpreted openly as referring to at least one instance of the article, element, apparatus, component, layer, means, step, etc., unless explicitly stated otherwise. Any combination of the above-described elements in all possible variations thereof is encompassed by the disclosure unless otherwise indicated herein or otherwise clearly contradicted by context.

The following is a certain embodiment further illustrating various aspects of the disclosed subject matter.

We claim:

1. An ammonia capture process comprising a cyclic regeneration process between Magnesium Ammonium Phosphate (MAP) and Magnesium Phosphate (MP) to achieve ammonia release wherein the process comprises:

a. providing a column having an L/N ratio of 4 to 6;
b. placing an MP/MAP medium into the column;
c. providing an ammonia containing medium and adjusting the medium pH range to greater than 9 and wetting the MP/MAP medium with water;
d. providing external heating to the column to control the column temperature;
e. conducting the pH adjusted ammonia containing medium into the wetted MP/MAP contained in the column and allowing the ammonia in the medium to be captured by MP in the column and converting the MP into MAP; and
f. stopping the flow of pH adjusted ammonia containing medium into the column and capturing and releasing ammonia from the column; wherein the medium is wetted prior to the start to prevent media channeling, and then the column is preheated and pressurized air is sent to the column.

2. The process according to claim 1, wherein an external heating source holds the column temperature to 60 degrees C.

3. The process according to claim 1, wherein the pH is 9 to 9.9.

4. The process according to claim 1 comprising providing thermal energy to cause conversion of MAP to MP and releasing ammonia and water vapor.

5. The process according to claim 4, wherein the water vapor and ammonia are released into an airstream.

6. The process according to claim 1, wherein the process comprises an absorption cycle wherein the pH adjusted ammonia medium is pumped through the column and the pH adjusted ammonia containing medium interacts with the MP and is absorbed to create MAP and ammonia reduced pH adjusted ammonia containing medium.

7. The process according to claim 1, further comprising purging the column with compressed heated pressurized air and carrying out ammonia vapor to an acid capture bath.

8. The process according to claim 1, wherein influent ammonium containing medium has a temperature of 50 degrees C. to 95 degrees C.

9. An ammonia capture process comprising a cyclic regeneration process between Magnesium Ammonium Phosphate (MAP) and Magnesium Phosphate (MP) to achieve ammonia release wherein the process comprises:

a. providing a column having an L/N ratio of 4 to 6;
b. placing an MP/MAP medium into the column;
c. providing an ammonia containing medium and adjusting the medium pH range to greater than 9 and wetting the MP/MAP medium with water;
d. providing external heating to the column to control the column temperature;
e. conducting the pH adjusted ammonia containing medium into the wetted MP/MAP contained in the column and allowing the ammonia in the medium to be captured by MP in the column and converting the MP into MAP;
f. stopping the flow of pH adjusted ammonia containing medium into the column and capturing and releasing ammonia from the column; and
g. further comprising purging the column with compressed heated pressurized air and carrying out ammonia vapor to an acid capture bath.

* * * * *